(12) United States Patent
Scheifele et al.

(10) Patent No.: US 11,951,783 B2
(45) Date of Patent: Apr. 9, 2024

(54) DAISY TIRE ELECTRONICS ASSEMBLY

(71) Applicant: BRIDGESTONE AMERICAS TIRE OPERATIONS, LLC, Nashville, TN (US)

(72) Inventors: Kevin E. Scheifele, Atwater, OH (US); Hans R. Dorfi, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 301 days.

(21) Appl. No.: 17/631,883

(22) PCT Filed: Jul. 28, 2020

(86) PCT No.: PCT/US2020/043810
§ 371 (c)(1),
(2) Date: Jan. 31, 2022

(87) PCT Pub. No.: WO2021/025896
PCT Pub. Date: Feb. 11, 2021

(65) Prior Publication Data
US 2022/0274451 A1    Sep. 1, 2022

Related U.S. Application Data

(60) Provisional application No. 62/882,797, filed on Aug. 5, 2019.

(51) Int. Cl.
*B29D 30/00* (2006.01)
*B60C 23/04* (2006.01)
(Continued)

(52) U.S. Cl.
CPC ...... *B60C 23/0493* (2013.01); *B29D 30/0061* (2013.01); *B60C 23/20* (2013.01); *B29D 2030/0077* (2013.01); *B60C 2019/004* (2013.01)

(58) Field of Classification Search
CPC .......... B60C 23/0493; B60C 23/20; B60C 2019/004; B60C 5/14; B29D 30/0061; B29D 2030/0077; B29D 2030/0072
See application file for complete search history.

(56) References Cited

U.S. PATENT DOCUMENTS

2007/0080795 A1* 4/2007 Ichikawa ............ B60C 23/0413
340/447
2009/0115591 A1* 5/2009 Mancosu ............ B60C 23/0493
340/447
(Continued)

*Primary Examiner* — David J Bolduc

(57) ABSTRACT

A tire electronics assembly includes a base and a plurality of modules. The base is mechanically attached to the tire and includes an electronic device. A plurality of mechanical attachment elements are arranged on the base in a circular array. Each module includes an electronic device and a mechanical attachment element. Each mechanical attachment element on a module is configured to releasably mechanically attach to any one of the mechanical attachment elements on the base. In this configuration, the modules are interchangeably mechanically attachable to the base in the circular array. The base further includes a plurality of electrical terminals arranged in a circular array. Each module has an electrical terminal that is configured to releasably electrically connect with any one of the electrical terminals on the base, whereby the modules are interchangeably electrically connectable with the base in the circular array.

20 Claims, 4 Drawing Sheets

(51) Int. Cl.
 *B60C 23/20* (2006.01)
 *B60C 19/00* (2006.01)

(56) References Cited

U.S. PATENT DOCUMENTS

| | | | |
|---|---|---|---|
| 2009/0183562 A1* | 7/2009 | Brusarosco | B60C 23/0493 73/146.5 |
| 2011/0140581 A1* | 6/2011 | Weston | B60C 23/0493 174/250 |
| 2015/0191055 A1* | 7/2015 | Schumacher | B60C 23/0408 340/447 |
| 2016/0343178 A1* | 11/2016 | Lesesky | B60C 19/00 |
| 2018/0297424 A1* | 10/2018 | Mori | B60C 19/00 |
| 2018/0370301 A1* | 12/2018 | Sekizawa | G01M 17/02 |
| 2020/0130433 A1* | 4/2020 | Stewart | H01Q 1/2241 |
| 2022/0009295 A1* | 1/2022 | Rey | B60C 23/0493 |

\* cited by examiner

DAISY TIRE ELECTRONICS ASSEMBLY

FIELD OF THE INVENTION

This technology includes electronic devices for sensing conditions of a tire on a vehicle.

BACKGROUND

Electronic devices can be used to sense conditions of a tire on a vehicle. Such devices include air pressure and temperature sensors that are mounted inside the tire, and also include radio frequency transmitters for transmitting pressure and temperature signals from the tire to the vehicle.

SUMMARY

An electronics assembly is provided for use with a tire. In a given example, the assembly includes a base and a plurality of modules. The base is mechanically attached to the tire and includes an electronic device. A plurality of mechanical attachment elements are arranged on the base in a circular array. Each module includes an electronic device and a mechanical attachment element. Each mechanical attachment element on a module is configured to releasably mechanically attach to any one of the mechanical attachment elements on the base. In this configuration, the modules are interchangeably mechanically attachable to the base in the circular array.

The base further includes a plurality of electrical terminals arranged in a circular array. Each module has an electrical terminal that is configured to releasably electrically connect with any one of the electrical terminals on the base, whereby the modules are interchangeably electrically connectable with the base in the circular array.

DETAILED DESCRIPTION

Figure 1:
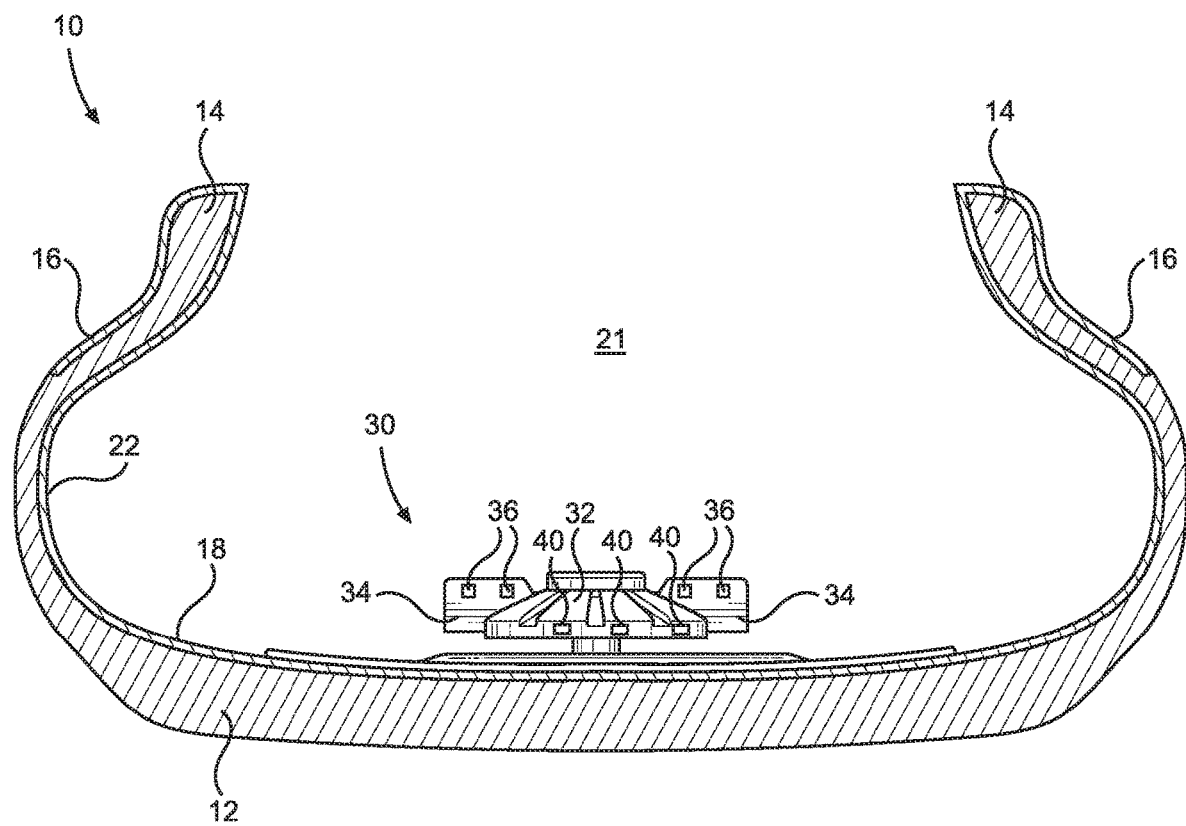
FIG. 1 is a schematic sectional view of a tire and an electronics assembly for use with the tire.

The structures illustrated in the drawings include examples of the elements recited in the claims. The illustrated structures thus include examples of how a person of ordinary skill in the art can make and use the claimed invention. They are described here to provide enablement and best mode without imposing limitations that are not recited in the claims. One or more elements of one embodiment may be used in combination with, or as a substitute for, one or more elements of another embodiment as needed for any particular implementation of the invention.

As shown in FIG. 1, a pneumatic tire 10 includes a tread 12, bead portions 14, and sidewalls 16 interconnecting the tread 12 with the bead portions 14. An inner surface 18 of the tire 10 defines the periphery of a cavity 21 within the tire 10. The inner surface 18 in this example is provided by an innerliner 22 that reaches fully throughout the interior of the tread 12, the bead portions 14, and the sidewalls 16.

Also shown in FIG. 1 is an electronics assembly 30 mounted on the tire 10. The electronics assembly 30 in this example includes a base 32 and multiple modules 34. Each module 34 includes one or more electronic devices 36. The devices 36 in the modules 34 may include air pressure sensors, temperature sensors, power generation or storage devices, radio frequency transmitters, radio frequency receivers, and/or any other electronic devices suitable for obtaining and/or providing information relating to conditions of the tire 10.

The base 32 also includes one or more electronic devices 40. These may include an electronic device 40 configured to provide a unique identification signal for identifying the tire 10 in distinction from another tire on the same vehicle or a different vehicle. Other electronic devices 40 in the base 32 may be configured to receive and/or transmit signals between the devices 40 in the base, the devices 36 in the modules 34, and the vehicle. In each case, the electronic devices 36 and 40 shown schematically in the drawings can be configured in any suitable manner known in the art.

Figure 2:
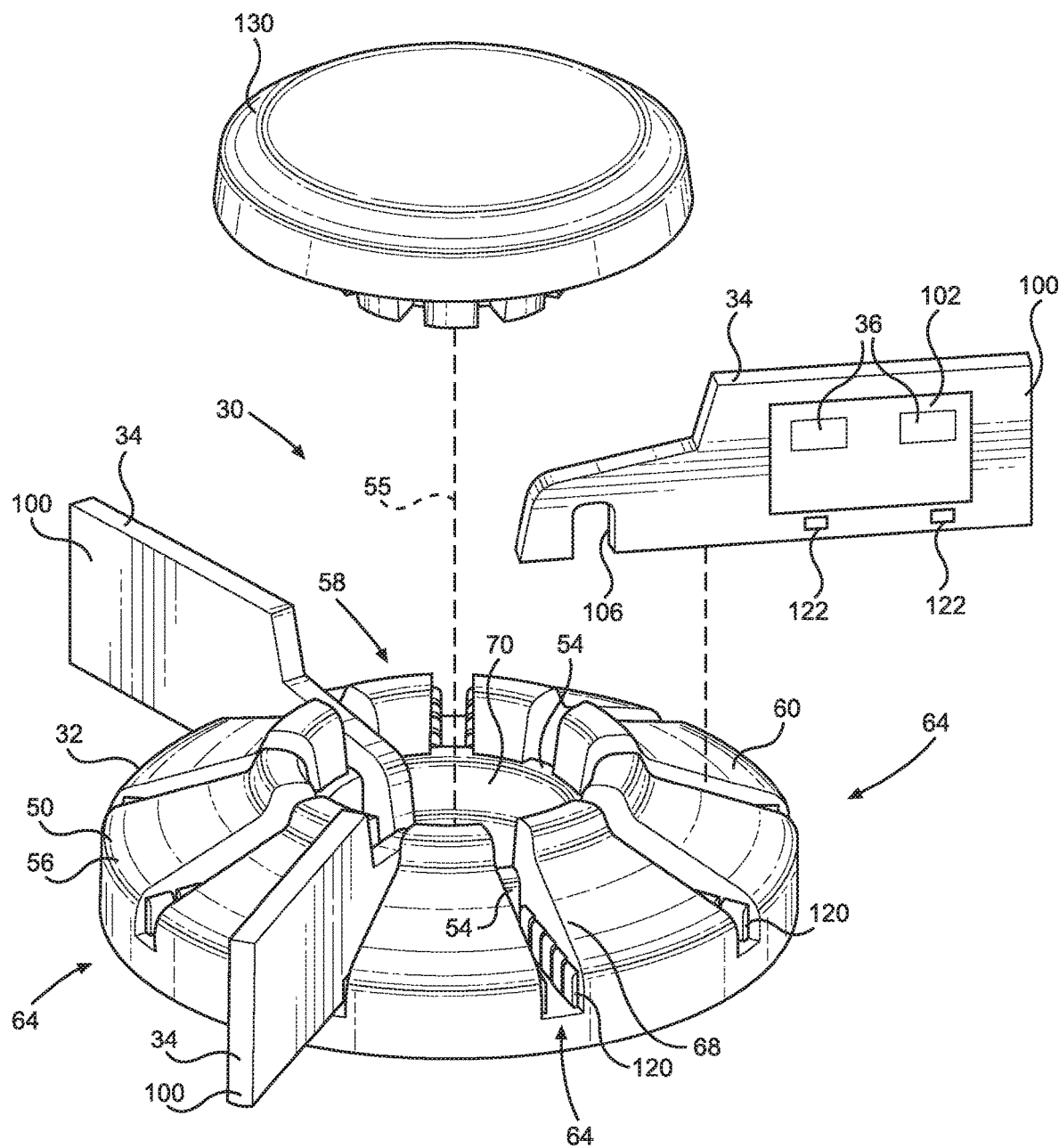
FIG. 2 is an exploded view of parts of the electronic assembly of FIG. 1.

The base 32 of the electronics assembly 30 is attached to the tire at the interior of the tire 10. As shown in FIG. 2, the base 32 includes a housing 50 containing the electronic devices 40. Mechanical attachment elements 54 face upward from the housing 50.

The housing 50 has a vertical axis 55, as viewed in the drawings, with a circular periphery 56 and a circular central recess 58 centered on the axis 55. An upper surface 60 of the housing 50 is inclined radially inward and axially upward from the periphery 56 to the recess 58. A plurality of slots 64 are arranged in a circular array centered on the axis 55. The slots 64 are elongated radially relative to the axis 55 and are equally spaced apart circumferentially about the axis 55. Each slot 64 has an open inner end at the recess 58, an open outer end at the periphery 56 and an open top at the upper surface 60.

The mechanical attachment elements 54 on the base 32 are arranged in radial alignment with the slots 64. Specifically, the housing has an annular wall 70 that is centered on the axis 55. The annular wall 70 is located at the recess 58 and reaches circumferentially beneath the open inner ends of the slots 64. Each mechanical attachment element 54 is defined by a respective portion of the annular wall 70 beneath the open inner end of a respective slot 64.

The modules 34 of FIG. 1 include housings 100 (FIG. 2) containing the electronic devices 36. The housings also contain printed circuit boards 102 (shown schematically) upon which the electronic devices 36 are mounted. Each housing 100 is shaped as a board that generally corresponds to the shape of the printed circuit board 102 and is sized to fit closely within any one of the slots 64 in the base 32. Each housing 100 further has a notch 106 that is sized and shaped to fit closely over any one of the mechanical attachment elements 54 at the inner ends of the slots 64. In this configuration, the modules 34 are interchangeably mechanically attachable to the base 32 in circumferentially spaced-apart positions projecting radially outward in a circular array.

Figure 3:
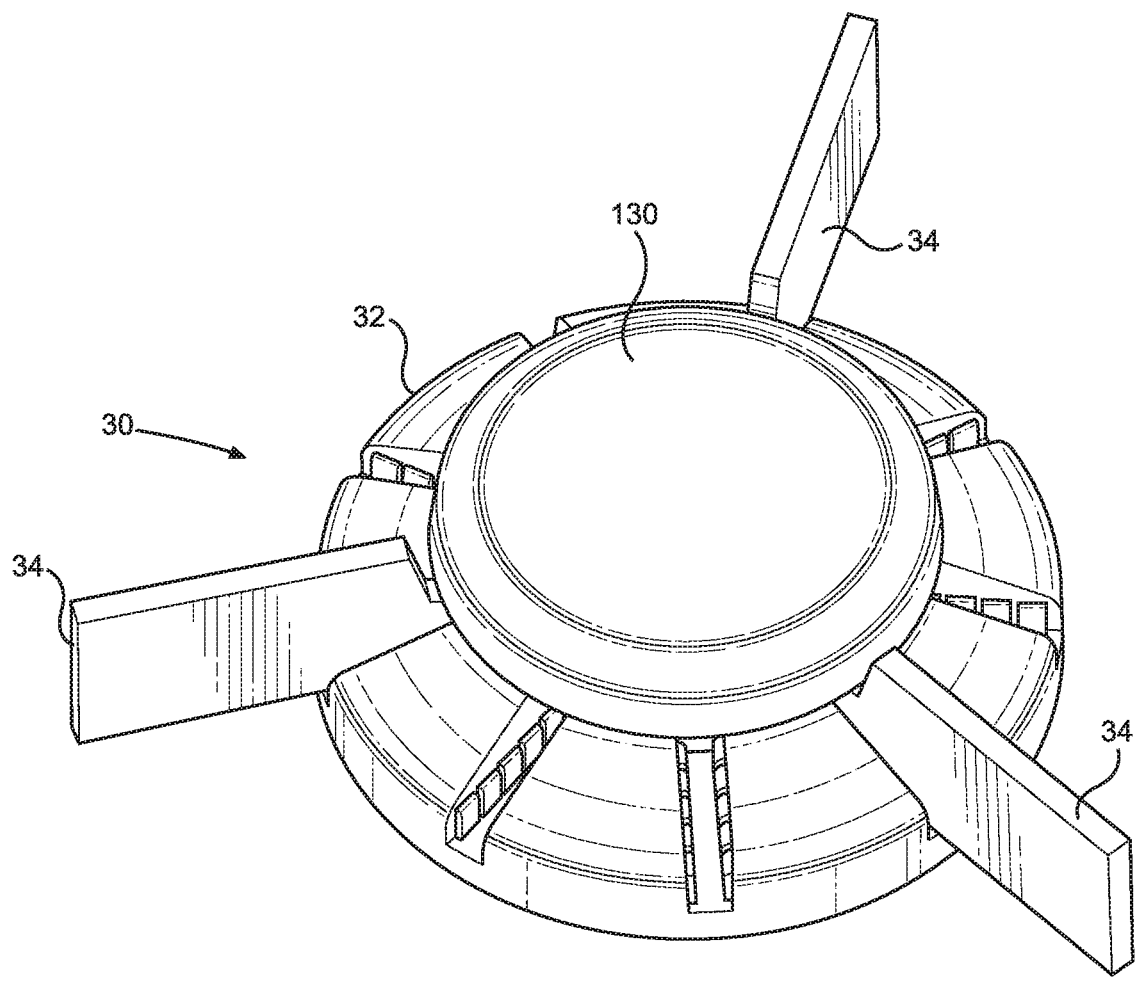
FIG. 3 is a perspective view of the electronics assembly.

As further shown in FIG. 2, each slot 64 in the base 32 contains one or more electrical terminals 120. The electrical terminals 120 on the base 32 are located within the slots 64 at opposite sides of the slots 64. Each module 34 also has one or more electrical terminals 122. These electrical terminals 122, which are shown schematically, may comprise any suitable devices known in the art. The terminals on the modules 34 are located at opposite sides of the housings 100 so that the terminals 122 on each one of the modules 34 can releasably electrically connect with the terminals 120 in any one of the slots 64. Accordingly, the modules 34 are interchangeably electrically connectable with the base 32 in circumferentially spaced-apart positions projecting radially outward in a circular array. A cap 130 interlocks with the base 32 at the top of the assembly 30 to secure the modules 34 in place on the base 32, as shown in FIG. 3.

Figure 4:
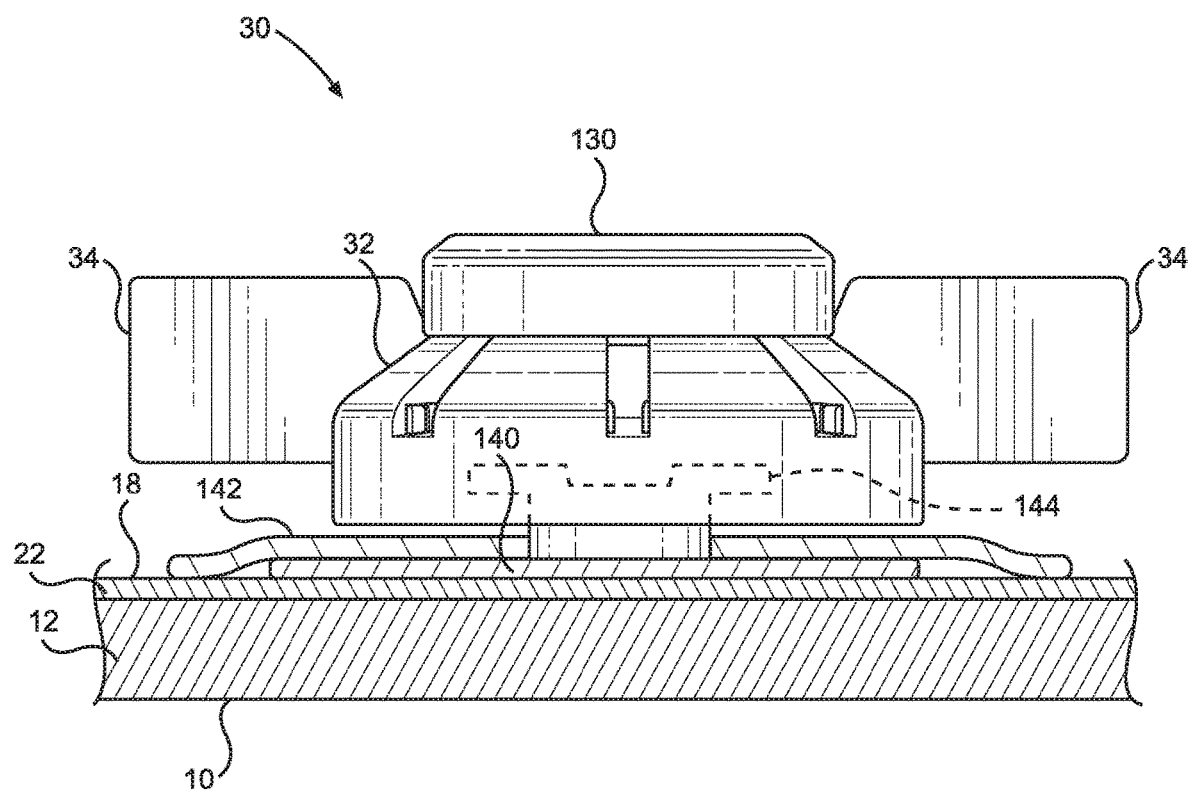
FIG. 4 is a schematic sectional view showing the electronics assembly mounted on the tire.

As noted above, the base 32 is attached to the tire 10 at the interior of the tire 10. As shown in FIG. 4, the base 32 in the given example is mounted on a platform 140. The platform 140 is installed between the innerliner 22 and an attachment layer 142 adhered to innerliner 22. A locking device 144 projects upward from the platform 140 and comprises a twist-lock or other suitable device configured to interlock with the base 32.

This written description sets for the best mode of carrying out the invention and describes the invention so as to enable a person of ordinary skill in the art to make and use the invention, by presenting examples of the elements recited in the claims. The detailed descriptions of those elements do not impose limitations that are not recited in the claims.

What is claimed is:

1. An apparatus for use with a tire, comprising:
   a base attached to the tire, the base including an electronic device, and further including a plurality of mechanical attachment elements arranged in a circular array; and
   a plurality of modules, each of which contains an electronic device and a has mechanical attachment element, wherein each mechanical attachment element on a module is configured to releasably mechanically attach to any one of the mechanical attachment elements on the base, whereby the modules are interchangeably mechanically attachable to the base in the circular array.

2. An apparatus as defined in claim 1, wherein each mechanical attachment element on the base includes a slot aligned radially with a central axis of the circular array.

3. An apparatus as defined in claim 2, wherein each module is shaped as a board configured for insertion in any one of the slots.

4. An apparatus as defined in claim 1, wherein the base overlies an interior surface of the tire.

5. An apparatus as defined in claim 1, wherein the electronic device in the base is configured to provide a unique identification signal identifying the tire.

6. An apparatus as defined in claim 1, wherein the electronic devices in the modules include air pressure sensors.

7. An apparatus as defined in claim 1, wherein the electronic devices in the modules include temperature sensors.

8. An apparatus for use with a tire, comprising:
   a base attached to the tire, the base including an electronic device, and further including a plurality of electrical terminals arranged in a circular array; and
   a plurality of sensor modules, each of which contains an electronic device and has an electrical terminal, wherein each electrical terminal on a module is configured to releasably electrically connect with any one of the electrical terminals on the base, whereby the modules are interchangeably electrically connectable with the base in the circular array.

9. An apparatus as defined in claim 8, wherein each mechanical attachment element on the base includes a slot aligned radially with a central axis of the circular array.

10. An apparatus as defined in claim 8, wherein each module is shaped as a board configured for insertion in any one of the slots.

11. An apparatus as defined in claim 8, wherein the base overlies an interior surface of the tire.

12. An apparatus as defined in claim 8, wherein the electronic devices in the modules include air pressure sensors.

13. An apparatus as defined in claim 8, wherein the electronic devices in the modules include temperature sensors.

14. An apparatus as defined in claim 8, wherein the electronic device in the base is configured to provide a unique identification signal identifying the tire.

15. An apparatus as defined in claim 8, wherein the base includes a plurality of mechanical attachment elements arranged in a circular array, and each module has a mechanical attachment element configured to releasably mechanically attach to any one of the mechanical attachment elements on the base, whereby the modules are interchangeably mechanically attachable to the base in the circular array.

16. An apparatus comprising:
    a tire;
    a base attached to the tire, the base including an electronic device, and further including a plurality of mechanical attachment elements arranged in a circular array; and
    a plurality of modules, each of which contains an electronic device and a has mechanical attachment element, wherein each mechanical attachment element on a module is configured to releasably mechanically attach to any one of the mechanical attachment elements on the base, whereby the modules are interchangeably mechanically attachable to the base in the circular array.

17. An apparatus as defined in claim 16, wherein each mechanical attachment element on the base includes a slot aligned radially with a central axis of the circular array.

18. An apparatus as defined in claim 17, wherein each module is shaped as a board configured for insertion in any one of the slots.

19. An apparatus as defined in claim 16, wherein the electronic device in the base is configured to provide a unique identification signal identifying the tire.

20. An apparatus as defined in claim 16, wherein each module has an electrical terminal configured to releasably electrically connect with any one of the electrical terminals on the base, whereby the modules are interchangeably electrically connectable with the base in the circular array.

* * * * *